United States Patent

[11] 3,622,642

| [72] | Inventors | Charles Ferdinand Huebner<br>Chatham;<br>Renat Herbert Mizzoni, Long Valley;<br>William Richard Schearer, Chatham, all of N.J. |
|---|---|---|
| [21] | Appl. No. | 727,657 |
| [22] | Filed | May 8, 1968 |
| [45] | Patented | Nov. 23, 1971 |
| [73] | Assignee | CIBA Corporation |

[54] POLYHALOGENALKANES
3 Claims, No Drawings

| [52] | U.S. Cl. | 260/658 R |
|---|---|---|
| [51] | Int. Cl. | C07c 17/08 |
| [50] | Field of Search | 260/658 |

[56] References Cited
UNITED STATES PATENTS

| 2,255,605 | 9/1941 | Windecker et al. | 260/658 |
|---|---|---|---|
| 2,299,411 | 10/1942 | Rust et al. | 260/663 |
| 3,005,845 | 10/1961 | Bain | 260/658 X |
| 3,410,917 | 11/1968 | Louw | 260/658 |

*Primary Examiner*—Bernard Helfin
*Assistant Examiner*—Joseph A. Boska
*Attorneys*—Harry Goldsmith, Joseph G. Kolodny, Bryant W. Brennan and Edward J. Sites ABSTRACT: Methallyl dichlorides or their homologs are reacted with hydrogen bromide in the presence of a peroxide, to yield 2-bromomethyl-1,3-dichloropropane or its homologs, which are valuable biocides and intermediates.

POLYHALOGENALKANES

BACKGROUND OF THE INVENTION

According to L. F. Hatch et al., J. Am. Chem. Soc. 69, 2614(1947), the chlorination of methallyl chloride in carbon tetrachloride at 20°–30° proceed as follows:

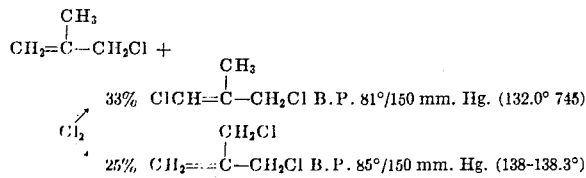

The resulting mixture of mainly 1,3-dichloro-2-methyl-1-propene and 3-chloro-2-chloromethyl-1-propene, as well as 1,2,3,-trichloro-2-methyl-propane and higher chlorinated products can only be separated with the use of sophisticated equipment, due to the close boiling points and other physical similarities.

Surprisingly, it was found that not only the pure 3-chloro-2-chloromethyl-1-propene can be reacted with hydrogen bromide in the presence of a peroxide, to yield the valuable 2bromomethyl-1,3-dichloro-propane, but also the above-mentioned impure mixture. Said final product was previously only obtained by the hazardous reaction of bromodichloromethane with diazomethane [W. H. Urry et al., J. Am. Chem. Soc. 86, 1815 (1964)]. In case an impure product, e.g. the above-cited mixture is used as a starting material, the desired 2-bromomethyl-1,3-dichloro-propane is easily separable from the reaction product.

SUMMARY OF THE INVENTION

The present invention concerns and has for its object the provision of a new process for the preparation of 2-bromomethyl-1,3-dichloro-propane or its homologs, which comprises reacting 3-chloro-2-chloromethyl-1-propene or its homologs alone, or in admixture with other halogenated hydrocarbons, with hydrogen bromide in the presence of a heavy metal, oxygen or a peroxide and isolating the 2-bromomethyl-1,3-dichloro-propane or its homologs according to conventional methods. The resulting products are useful intermediates and biocides, preferably pesticides, e.g. bactericides, fungicides, insecticides, acaricides or vermicides.

DESCRIPTION OF THE PREFERRED EMBODIMENTS

The preferred process of the invention can be depicted as follows:

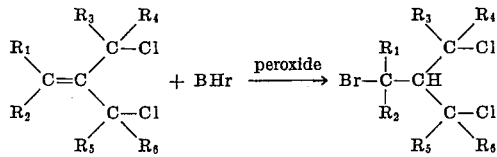

in which each of $R_1$ to $R_6$ is preferably hydrogen, but also lower alkyl, e.g. methyl, ethyl, n- or i-propyl or -butyl.

The heavy metals used in the above reaction are preferably paramagnetic metals, e.g. finely divided iron, nickel or cobalt. Advantageously inorganic or organic peroxides are used, e.g. persulfuric acid or ascaridol, preferably aliphatic or aromatic percarboxylic acids, e.g. peracetic, perlauric, perbenzoic or monoperphthalic acid, or especially their anhydrides.

The above reaction is carried out according to standard methods, advantageously while exposed to visible or ultraviolet light, in the presence or absence of diluents, preferably such as are inert to the reagents and are solvents thereof, such as unsubstituted or halogenated hydrocarbons, e.g. the above-mentioned byproducts of the starting material or other halogen compounds, e.g. carbon tetrachloride, and/or aliphatic hydrocarbons, e.g. low or medium boiling petroleum fractions, such as petroleum ether or n-hexane, preferably cycloalkanes, e.g. cyclohexane, hexahydrotoluene or -xylene, or decahydronaphthalene. Said reaction may further be performed in the presence or absence of other catalysts and/or inert atmospheres, at low temperatures, room temperature or elevated temperatures, at atmospheric or superatomospheric pressure.

The invention also comprises any modification of the above process, wherein a compound resulting as an intermediate at any stage thereof, is used as a starting material and the remaining steps are carried out or the process is discontinued at any stage thereof, or in which the starting material is formed under the reaction conditions. Those reagents are preferably used, which lead to the products indicated above as the preferred embodiments of the invention.

The starting material is known or, if new, may be prepared according to the methods used for the known products, e.g. those mentioned above.

The compounds of the invention can either be used as intermediates, for example, in the preparation of cyclopropyl-lower alkyl chlorides according to the following process:

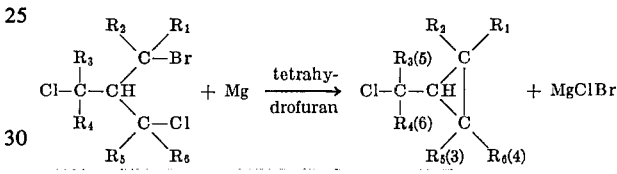

or can be used for pesticidal compositions, containing them in conjunction or admixture with inorganic or organic, solid or liquid additives, e.g. excipients, solvents, diluents, dispersants, wetting agents, adhesives, fertilizers and/or other pesticides. Spray solutions may be prepared with the use of medium or high boiling petroleum fractions, e.g. kerosene, other hydrocarbons. e.g. xylenes or tetrahydronaphthalenes, coal tar oil or vegetable oils and/or other halogenated hydrocarbons, e.g. tri- or tetrachloroethane, -ethene or -benzenes, having advantageously boiling points above 100°. Advantageous are aqueous emulsions, concentrates, pastes or wettable spray powders. Suitable emulsifiers or dispersants therein are either nonionic or ionic products, e.g. condensation products of ethylene oxide with higher aliphatic alcohols, mercaptans, acids or amines, such as the condensation product of 1 mol ethylene oxide with about 0.04 mol octadecanol, about 0.06 mol decylamine or about 0.08 mol dodecylmercaptan, or sodium dodecylsulfate or dodecylbenzenesulfonate, potassium or triethanol ammonium oleate or abietate, N-cetyl-pyridinium bromide or N,N-bis-hydroxyethyl-N-benzyl-N-dodecylammonium chloride. Dusting or casting preparations may contain the active ingredients in conjunction with talc, kaolin, bentonite, calcium carbonate or phosphate, coal, cork and/or wood powder. Solid preparations may also be granulated or may contain conventional additives that improve the distribution, penetration, adhesion and stability against rain and wind, such as fatty acids, resins, glues, casein and/or alginates.

The following examples are intended to illustrate the invention and are not to be construed as being limitations thereon. Temperatures are given in degrees Centigrade and all parts of percentages wherever given are such by weight.

EXAMPLE 1

Through the solution of 2 g. of 85 percent 3-chloro-2-chloro-methyl-1-propene and 46.4 mg. of benzoyl peroxide in 2 ml. cyclohexane, a fine stream of gaseous hydrogen bromide is bubbled for 1¼ hours and the reaction mixture is allowed to stand at room temperature overnight. (Gas chromatography of a sample of the crude mixture indicates only 15 percent remaining starting material.) It is diluted with cyclohexane, washed with water and aqueous sodium bicarbonate, dried over magnesium sulfate, filtered and evaporated below 50° in the vacuum of a water jet pump, to yield the 2-bromomethyl-1,3-dichloropropane as residue; it is about 90 percent pure according to gas chromatography and NMR.

EXAMPLE 2

A 5 liter three-necked flask is charged with 2.0 kg. 42.8 percent 3-chloro-2-chloromethyl-1propene and 6.5 g. benzoyl peroxide. The stirrer is turned on and hydrogen bromide introduced into the batch either below the surface, or above the surface if vigorous stirring and mild pressure (about one-third atmosphere) is applied, while maintaining the temperature between 20° and 30°. Part way through the addition of the hydrogen bromide, its absorption slows down so that an additional 3 g. benzoyl peroxide are added. When no further hydrogen bromide is being taken up, the solution is allowed to stand overnight at room temperature. In the morning the stirrer is again turned on and 1 liter 10 percent aqueous sodium hydroxide is cautiously added over a 40 minute period, while maintaining the temperature near 25°. The aqueous phase is allowed to settle out and is discarded. The organic phase is dried over 100 g. anhydrous magnesium sulfate and filtered. The filtrate is distilled through short, packed column under reduced pressure to yield the following fractions:

| Fraction | Boiling Point | Pressure mm. Hg | Weight of fraction |
|---|---|---|---|
| 1 | 69°–80° | 100 | 848.4 g. |
| 2 | 80°–110° | 100 | 149.6 g. |
| 3 | 82°–91° | 20 | 243.2 g. |
| 4 | 91°–95° | 20 | 1260.0 g. |

Fractions 1 and 2 contain less than 1 percent, fraction 3 contains 36.2 percent and fraction 4 contains 88.3 percent 2-bromomethyl-1,3-dichloropropane according to gas-chromatography. The latter fraction can further be purified by redistillation in vacuo.

The starting material used contains an approximately equal quantity of 1,3-dichloro-2-methyl-1-propene.

To the mixture of 500 g. 2-bromomethyl-1,3-dichloropropane (89 percent and 2.5 liters tetrahydrofuran, kept under nitrogen, 65 g. magnesium turnings are added portionwise during 1½ hours while stirring and keeping the temperature between 25° and 30°. The magnesium is dissolved after 15 minutes and the mixture is allowed to stand overnight at room temperature. Hereupon 2 liters xylene are added and the mixture distilled on a 38 cm. column under reduced pressure, starting at 180 mm. Hg and finishing at 30 mm. Hg. The distillate is redistilled on a 76 cm. column at the same pressure, to yield a 2.87 kg. forerun containing about 1 percent cyclopropylmethyl chloride and 183 g. main fraction containing 65 percent cyclopropylmethyl chloride, 20.2 percent tetrahydrofuran and 12.6 percent xylene (according to gaschromatographic analysis).

Said product can be used in the analogous manner as the cyclopropylmethyl bromide or its homologs, which are intermediates in the process described in application Ser. No. 592,314, filed Nov. 7, 1966, now U. S. Pat. No. 3,385,857, for the preparation of cyclopropyl-acetonitrile, b.p. 145°–147°.

We claim:

1. In the process for the preparation of 2-bromomethyl-1,3-dichloro-propane by reacting 3-chloro-2-chloromethyl-1-propene with hydrogen bromide in the presence of a heavy metal, oxygen or a peroxide, the modification which consists in reacting 3-chloro-2-chloromethyl-1-propene in admixture of 1,3-dichloro-2-methyl-1-propene with hydrogen bromide in the presence of an aliphatic or aromatic percarboxylic acid or its anhydride at or below 30° C until the hydrogen bromide uptake ceases, washing the resulting mixture drying it and distilling off the products different from the remaining 2-bromomethyl-1,3-dichloropropane at reduced pressure and a temperature at or below 110° C.

2. Process according to claim 1, wherein benzoyl peroxide is used as percarboxylic acid anhydride.

3. Process according to claim 1, wherein an about 8.5:1.5 to 1:1 mixture of 3-chloro-2-chloromethyl-1-propene and 1,3-dichloro-2-methyl-1-propene is used as starting material.

* * * * *